(12) United States Patent
Gross et al.

(10) Patent No.: US 7,950,186 B2
(45) Date of Patent: May 31, 2011

(54) CLIP-ON INNER PANEL SEAL ASSEMBLY

(75) Inventors: David M. Gross, Clinton Township, MI (US); Alan Peth, Holland, OH (US); Mark Faunce, Milford, MI (US)

(73) Assignee: Cooper-Standard Automotive Inc., Novi, MI (US)

( * ) Notice: Subject to any disclaimer, the term of this patent is extended or adjusted under 35 U.S.C. 154(b) by 393 days.

(21) Appl. No.: 11/595,019

(22) Filed: Nov. 9, 2006

(65) Prior Publication Data

US 2008/0110101 A1 May 15, 2008

(51) Int. Cl.
*E06B 7/16* (2006.01)
(52) U.S. Cl. .................... 49/492.1; 49/490.1; 49/496.1
(58) Field of Classification Search .............. 49/377, 49/475.1, 492.1, 490.1, 493.1, 496.1; 24/458, 24/487; 296/146.9; 403/326
See application file for complete search history.

(56) References Cited

U.S. PATENT DOCUMENTS

| | | | | |
|---|---|---|---|---|
| 2,909,819 A * | 10/1959 | Fernberg | ........................ | 411/477 |
| 4,696,128 A * | 9/1987 | Fukuhara | ..................... | 49/492.1 |
| 5,085,005 A * | 2/1992 | Yasukawa et al. | .............. | 49/377 |
| 5,261,188 A * | 11/1993 | Vaughan | .......................... | 49/377 |
| 5,267,415 A * | 12/1993 | Vaughan | .......................... | 49/377 |
| 5,363,537 A * | 11/1994 | Schneider et al. | .............. | 24/289 |
| 5,433,038 A * | 7/1995 | Dupuy | ............................. | 49/377 |
| 5,463,831 A * | 11/1995 | Shinagawa et al. | ............. | 49/377 |
| 5,519,968 A * | 5/1996 | Dupuy | .......................... | 49/489.1 |
| 5,740,640 A | 4/1998 | Yasuda | | |
| 5,775,030 A * | 7/1998 | Hamabata | ........................ | 49/377 |
| 5,799,442 A * | 9/1998 | Takahashi et al. | .............. | 49/377 |
| 6,061,882 A * | 5/2000 | Otte-Wiese | ...................... | 24/487 |
| 6,070,363 A * | 6/2000 | Vance | .............................. | 49/377 |
| 6,321,490 B1* | 11/2001 | Vance | .............................. | 49/377 |
| 6,370,824 B1* | 4/2002 | Keeney et al. | .................. | 49/441 |
| 6,598,348 B2* | 7/2003 | Palicki | .......................... | 49/479.1 |
| 2004/0200151 A1* | 10/2004 | Tognetti et al. | ................. | 49/377 |

FOREIGN PATENT DOCUMENTS

WO WO 2005/009767 2/2005

OTHER PUBLICATIONS

PCT/US2007/083878 International Search Report, mailed Jun. 16, 2008.

\* cited by examiner

*Primary Examiner* — Jerry Redman
(74) *Attorney, Agent, or Firm* — Fay Sharpe LLP

(57) ABSTRACT

A vehicle seal assembly incorporates an integrated attachment feature to secure a flexible seal to closely spaced inner and outer body panels joined along a flange region. First and second spaced openings are aligned in a direction extending from the flange region. The seal assembly includes a generally planar portion having a finger secured at one end and extending outwardly in a generally parallel direction to the planar portion. The finger extends through the first opening and directs the seal assembly as the seal assembly is advanced toward the second opening where a retaining member snap fits therethrough for retaining the weatherstrip to the body panel.

17 Claims, 3 Drawing Sheets

CLIP-ON INNER PANEL SEAL ASSEMBLY

BACKGROUND OF THE INVENTION

This application is directed to a weatherstrip or weatherseal, and particularly one that includes an integrated attachment arrangement. The subject new weatherstrip finds use in areas where little room is available to secure the weatherstrip and finds particular use in an automotive vehicle, for example, between or along closely spaced body panels.

As is known, selected areas of a vehicle require a weatherstrip or weatherseal. In particular instances, such as the A-pillar, B-pillar, C-pillar and rocker panel, there is little room to provide attachment of the weatherstrip to the vehicle. It is not uncommon to use a riveted attachment scheme such as shown in FIG. 1 where welded-on studs or attachment pins are provided on an outer body panel adjacent its interface with an inner body panel. The studs or pins are used as a means to securely attach the weatherstrip to the vehicle since other known attachment arrangements cannot be effectively used. As will be appreciated, the weatherstrip requires corresponding openings or holes in a bracket carrying or joined to the weatherstrip in order to secure the weatherstrip to these pins.

Alternatively, tape is sometimes used as a means for attaching the weatherstrip to the vehicle in these hard-to-access locations. Adhesive tapes, however, encounter issues with regard to assembly, i.e., installation of the weatherstrip with the exposed adhesive and proper positioning of the weatherstrip on the vehicle, as well as corresponding potential warranty issues that may result, generally leads to tape being a less desirable selection for attaching the weatherstrip.

Thus, a need exists to develop a robust seal that can be packaged and attached in areas of a vehicle that previously required additional parts or processes to allow the attachment of a weatherstrip. The weatherstrip finds particular application in the automotive industry where two panels are assembled together with only a small space for attachment.

A need further exists to eliminate the tooling associated with installing attachment studs/pins, or to eliminate use of tape as an alternative securing method.

Known arrangements are also limited in the ability to be subsequently serviced, e.g., replaced, and are also limited in the shapes and conformations that the seal may undertake.

SUMMARY OF THE INVENTION

A vehicle seal assembly includes an integrated attachment feature for securing a seal to an associated vehicle having inner and outer panels joined along a flange region. The inner panel includes first and second spaced openings aligned in a direction extending from the flange region. The seal assembly includes a thin-walled portion dimensioned to overlie one of the panels and having a finger secured to one end for receipt through the associated first opening in a retaining member dimensioned for receipt though the associated second opening. A flexible seal extends outwardly from the planar portion of the assembly.

The retaining member preferably extends outwardly from the planar portion in a direction substantially perpendicular to the planar portion.

A finger includes first and second spaced finger portions that support the seal assembly.

In a preferred arrangement, the retaining member includes a ramped leading edge for deflecting the retaining member over an edge of the body panel adjacent the associated first opening.

Further, a raised cover may be provided over the finger and retaining member.

One benefit of the invention resides in the ability to mount the seal in tight areas.

Another benefit of the invention resides in the reduced costs of manufacture and assembly.

Still another benefit is found in the array of seal shapes or configurations that may be adopted with the attachment scheme.

Still other features and benefits of the invention will be apparent from a reading in the following detailed description.

DETAILED DESCRIPTION OF THE INVENTION

Figure 1:
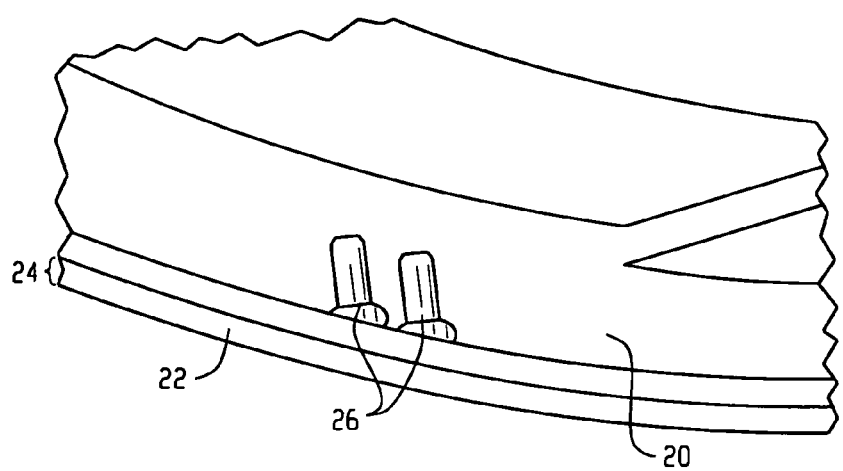
FIG. 1 is a prior art illustration of the prior art manner of attaching a seal assembly.

Turning first to FIG. 1, an inner body panel 20 is joined to an outer body panel 22, particularly along a flange region or area 24. For example, the flange is a joined region at peripheral edges of the inner and outer body panels and is oftentimes a welded arrangement where one edge of one body panel (usually the outer body panel) is folded onto an edge of the other body panel (usually the inner body panel) and welded to secure the body panels together along the edge of a vehicle surface such as a rocker panel, A-pillar, B-pillar, C-pillar, etc. of an automotive vechicle. It is common that the inner and outer door panels are closely spaced to one another in a region spaced inwardly from the flange region. That is, the inner panel is slightly offset and extends substantially parallel to the outer panel in a region adjacent and spaced inwardly from the flange region. As noted above, it becomes difficult to secure a seal such as a weatherseal in these types of regions because there is little room for attaching the seal to one of the panels.

As shown in FIG. 1, and briefly described above, it is common to employ studs or pins 26 that are welded to the inner panel adjacent the flange region. The pins 26 form one portion of the attachment assembly of an associated seal (not shown). For example, a bracket is typically secured to the weatherseal and has openings formed therein for receipt over the pins 26. This attachment arrangement requires expensive equipment to secure the pins to the body panel, and also to provide the bracket in the seal assembly. Moreover, the tight area makes it difficult to remove the seal assembly once it has been installed.

Figure 2:
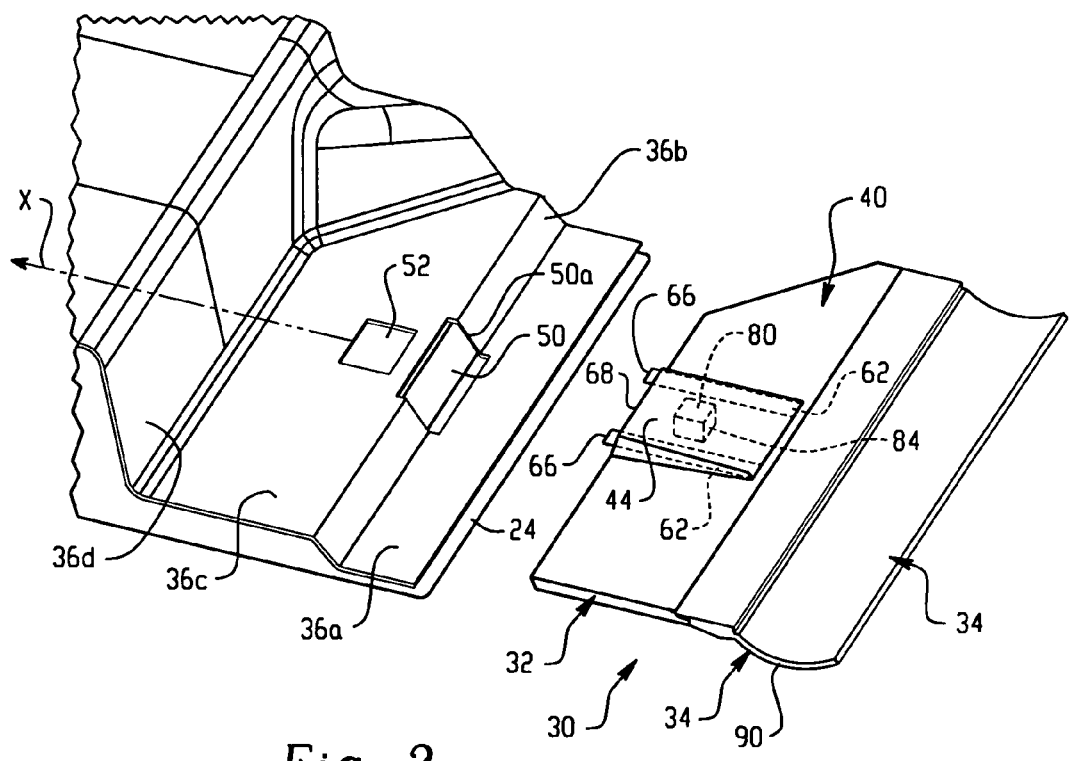
FIG. 2 is a perspective view of the seal assembly prior to installation.
Figure 3:
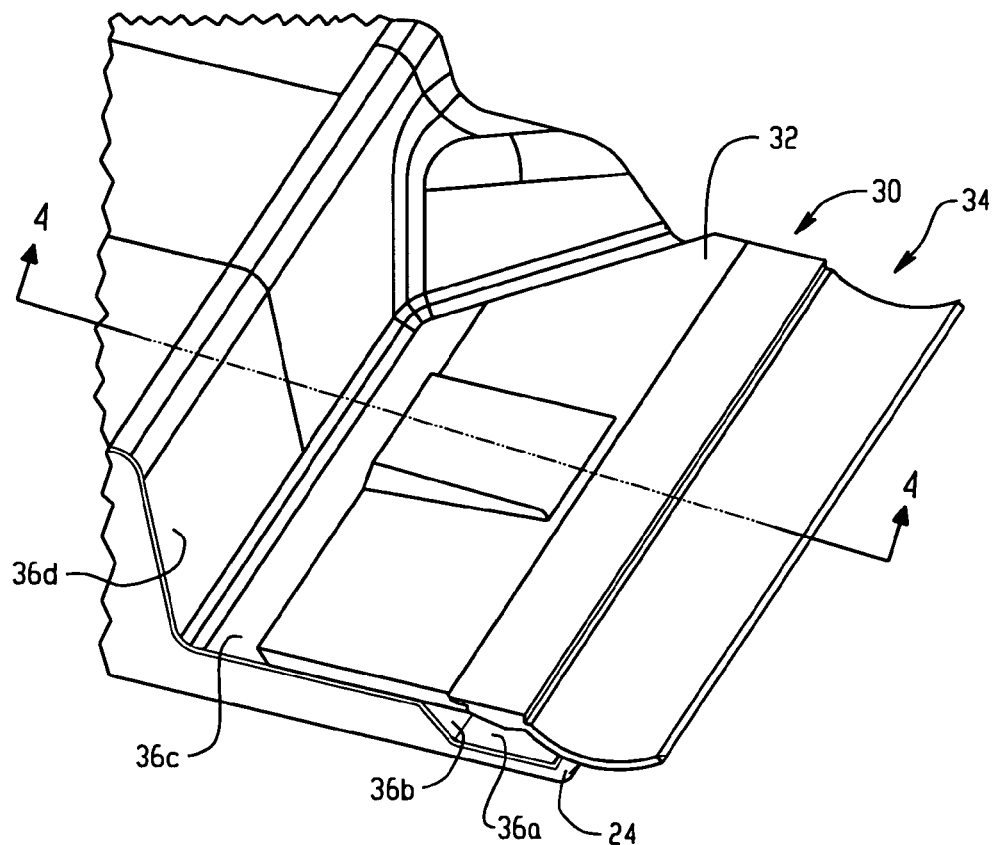
FIG. 3 is a perspective view of the seal assembly shown in an installed condition adjacent the flange region joining inner and outer body panels.

FIGS. 2 and 3 illustrate a weatherstrip or seal assembly 30 with integral fastener clips that finds particular use in these tight areas. The seal assembly 30 is comprised of two major portions, a rigid, mounting portion 32 and a softer, seal portion 34. It is preferable that the rigid and soft portions 32, 34 be formed of moldable materials, for example, a rigid plastic 32 and a soft TPE for seal portion 34. For example, a two-shot molded process allows the rigid plastic to be introduced into a mold cavity in a first shot, and a soft TPE introduced into the mold cavity in a second shot. In this manner, the two dissimilar materials are fused along interfacing regions so that when fully set, a one-piece seal assembly 30 results.

Figure 4:
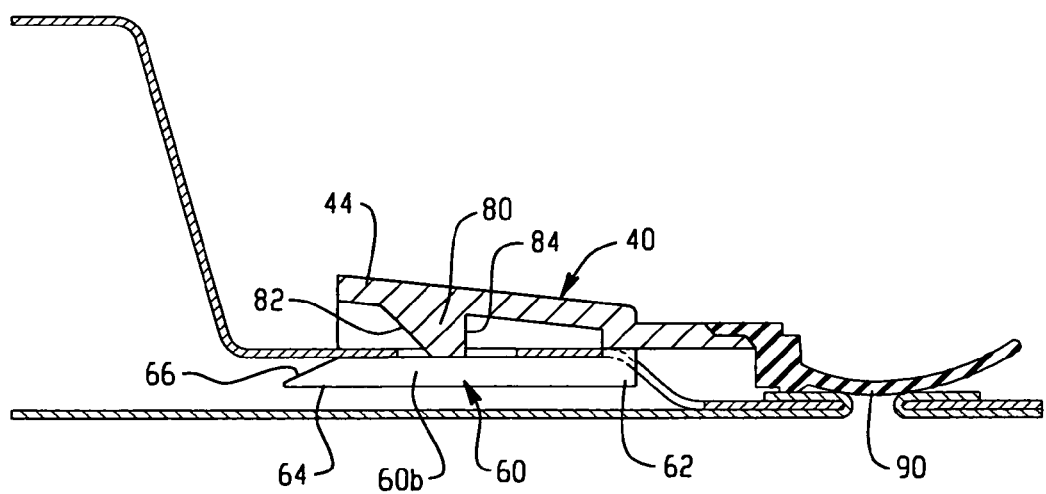
FIG. 4 is a cross-sectional view taken generally along the lines 5-5 of FIG. 2.

With continued reference to FIGS. 2 and 3, and additional reference to FIG. 4, the inner body panel 20 includes a first planar portion 36a that is secured to the outer body panel along the flange region 24. First portion 36a merges into a transition or second portion 36b that steps the inner body panel and interconnects the first portion with a generally planar, third portion 36c. An additional step or fourth portion identified as 36d is provided in the inner body panel in some regions of the automotive vehicle. In the illustrated embodiment, the outer body panel 22, is generally planar from the flange region 24, although it will be appreciated that the outer body panel may have a different-contour as it proceeds away from the flange region. Thus, the outer body panel abuts with the first planar portion 36a of the inner body panel adjacent the flange region and is disposed in closely dimensioned, parallel relation with the generally planar, third portion 36c.

The rigid portion 32 preferably includes a thin-walled, generally planar portion 40 that is dimensioned to overlie the inner body panel of the associated vehicle. Extending upwardly from the generally planar portion is a raised portion 44 (FIG. 4) for reasons to be described in greater detail below.

As best illustrated in FIG. 2, a first opening 50 is formed in the inner panel 36, particularly through the transition portion 36b. A second opening 52 extends through the planar portion 36c of the inner panel and is preferably aligned or centered with opening 50 in a direction substantially perpendicular from the edge of the flange 24, shown here as spaced inwardly along reference insertion axis "x". As is evidenced in FIG. 2, the second opening 52 is not-as wide (measured transversely to axis x) as the first opening 50. One skilled in the art will also appreciate that the first opening may extend partially into the first planar portion 36a and partially into the second planar portion 36c of the inner panel, and entirely across the transition region 36b.

The weatherseal assembly 30 includes a finger 60 (FIG. 4), which in the preferred embodiment includes first and second finger portions 60a, 60b that are cantilever mounted from an underside of the weatherseal. Particularly, a first end 62 of each finger portion defines a connection region with the rigid plastic portion 32. A second or leading end 64 or each finger portion preferably includes a tapered surface 66. The leading end 64 of the fingers, and particularly the tapered surfaces 66, extend outwardly beyond an inner edge 68 of the raised portion 44. In this manner, as the weatherstrip assembly 30 is advanced over the flange region 24, the fingers 64 pass through the first opening 50 and beneath the planar portion 36c of the inner body panel. The tapered surfaces 66 angle upwardly from a lower surface of each finger as it extends longitudinally toward the first end 62. This angular orientation of surface 66 engages edge 50a of the body panel defining the first opening 50 and urges the finger portions downwardly as the weatherstrip is advanced inwardly from the flange region 24. Thus, the fingers protrude through the opening 50 and beneath the planar portion 36c of the inner body panel and toward the opening 52. Similarly, angled edges 68 are provided along the outer side edges of the finger portions (FIG. 5) to provide guiding/alignment of the finger portions into the first opening as the seal assembly is advanced relative to the body panels.

The remainder of the rigid plastic portion 32 of weatherstrip rides over the upper surface of the planar portion 36c of the inner body panel. The weatherstrip continues advancing inwardly until a retaining member 80 (FIGS. 2 and 4), that extends downwardly from the raised portion 40, snaps through the second opening 52 in the inner body panel. The retaining member 80 also includes a tapered leading edge 82 that urges the retaining member and raised portion 40 over the edge 50a of the opening 50 so that the retaining member rides over that portion of the planar portion 36c located between the first and second openings 50, 52. Thus, the retaining member 80 slides over the generally planar surface 36c of the inner panel until the retaining member snaps through the second opening 52 and shoulder 84 prevents inadvertent removal of the weatherstrip once the seal assembly is secured to the body panel. This integrated attachment scheme provides a snap fit that is audible to the installer, and also provides a tactile feedback to the installer as the retaining member 80 snaps through opening 52.

It will also be appreciated that if the weatherstrip needs to be subsequently removed from the vehicle after installation, a work member such as the leading edge of a screwdriver can be inserted beneath the raised portion and leveraged against the outer surface of the planar portion 36c to lift the raised portion away from the surface 36c and remove the retaining member 80 from the opening 52.

Figure 5:
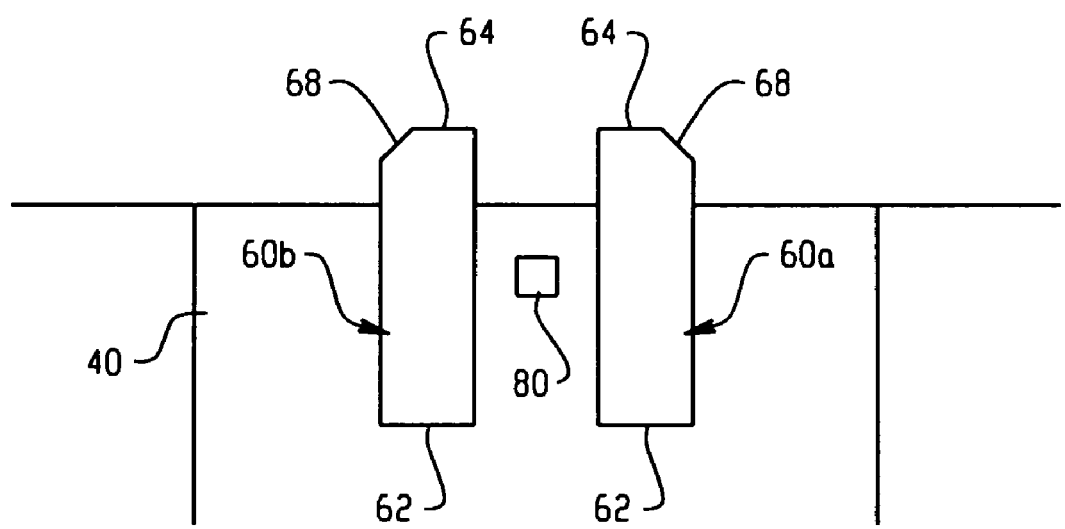
FIG. 5 is a plan view of the bottom or underside of the seal assembly.

The finger portions 60 are preferably separated from one another by a dimension slightly greater than the width of the retaining member 80 as best shown in FIG. 5. In this manner, the finger portions 60 serve to guide the weatherstrip/seal assembly as it is inserted toward the second opening 52. Particularly, finger portions 60 proceed through the opening 50 and align the retaining member with the second opening 52. This spaced arrangement of the finger portions is also necessary for manufacture of the rigid portion in a mold where slides can be easily removed in order to form the finger portions in spaced relation from the underside of the rigid portion and also allow formation of the retaining member.

It will also be appreciated from FIG. 4 that the soft sealing portion 34 can adopt a wide variety of conformations. Here, a simple curved seal lip 90 is biased through its curved shape into sealing engagement with adjacent flanges of automotive body panels. In other instances, it will be appreciated that the seal may be a seal bulb or differently conformed seal lip depending on the type of surface that the seal will engage.

The weatherstrip is preferably molded in a two-shot molding process, molded to a wide variety of shapes, and the OEM can easily modify existing tooling to form the openings 50, 52 in the body panels. Thus, this arrangement provides for an integrated snap-fit connection of a seal assembly that eliminates the use of pins or tape, is easy to install, and is easily serviced. The retaining members may be spaced along the length of the weatherstrip and the finger portions/retaining members resist inadvertent lift-out while providing a pinching or retaining force on the inner body panel. Preferably, the rigid plastic portion 32 is a polypropylene or nylon while the softer sealing portion 34 is a TPE (thermoplastic elastomer) or TPV (thermoplastic vulcanizate), although it will be appreciated that other materials may be used without departing from the scope and intent of the invention.

The invention has been described with reference to the exemplary embodiments. Obviously, modifications and alterations will occur to others upon reading and understanding the preceding detailed description. It is intended that the invention be construed as including all such modifications and alterations.

Having thus described the invention, it is now claimed:

1. A vehicle seal assembly with integrated attachment feature for securing the seal to an associated vehicle having inner and outer panels joined along a flange region, the inner panel having first and second spaced openings aligned in a direction extending from the flange region, the vehicle seal comprising:

a thin-walled, generally planar portion dimensioned to overlie one of the panels, the planar portion including a finger secured at one end and extending outwardly in a substantially parallel direction from the planar portion and dimensioned for receipt through the associated first opening and between the associated inner and outer panels, and a retaining member dimensioned for receipt in the associated second opening upon receipt of the finger through the associated first opening, wherein the planar portion further includes a cover raised relative to the planar portion and forming an internal cavity overlying the finger and completely overlying the retaining member, the retaining member being axially recessed relative to a terminal edge of the cover to protect the retaining member as the planar portion is advanced toward the first and second openings and preventing inadvertent release of the retaining member from the second opening.

2. The vehicle seal assembly of claim 1 wherein the retaining member protrudes outwardly from the planar portion in a direction substantially perpendicular to the planar portion.

3. The vehicle seal assembly of claim 1 wherein the finger includes first and second spaced finger portions.

4. The vehicle seal assembly of claim 3 wherein the finger portions extend in substantially parallel relation.

5. The vehicle seal assembly of claim 4 wherein the retaining member is positioned laterally between the first and second finger portions.

6. The vehicle seal assembly of claim 1 wherein the retaining member includes a ramped leading edge for deflecting the retaining member over an edge of the associated first opening.

7. The vehicle seal assembly of claim 1 wherein the finger includes a tapered leading edge for deflecting the finger to one side of the associated inner panel in response to insertion through the first opening.

8. The vehicle seal assembly of claim 1 wherein the finger extends outwardly from the planar portion for guiding the assembly onto the associated inner panel.

9. The vehicle seal assembly of claim 1 wherein the finger is cantilever mounted to the planar portion at one end and extends outwardly from the planar portion for guiding the seal assembly toward the associated first opening.

10. The vehicle seal assembly of claim 1 wherein the generally planar portion is a rigid plastic.

11. The vehicle seal assembly of claim 1 wherein the flexible seal is a lip seal adapted to engage a body panel.

12. The vehicle seal assembly of claim 1 wherein the flexible seal and the generally planar portion are fused along an interface thereof.

13. A vehicle seal assembly comprising:
a first body panel;
a second body panel joined to the first body panel along a terminal edge thereof;
the first and second body panels extending generally parallel to one another inwardly from the terminal edge and the first panel including first and second openings spaced from one another in a direction extending inwardly from the terminal edge; and
a seal having a flexible seal region adapted to engage with an associated vehicle surface, and an attachment portion formed from a dissimilar material than the flexible seal fused thereto, the attachment portion including a finger dimensioned for guiding receipt through the first opening and a generally planar portion extending generally parallel to the finger and including a cover raised relative to the planar portion and a retaining member extending outwardly therefrom for receipt through the second opening, the retaining member being axially recessed relative to a terminal edge of the cover to protect the retaining member as the planar portion is advanced toward the first and second openings and preventing inadvertent release of the retaining member from the second opening, wherein the finger includes first and second finger portions laterally spaced from one another in a direction substantially perpendicular to the direction of the openings spacing, wherein the finger portions include tapered ends for deflecting the finger portions between the first and second body panels as the attachment portion is advanced from the first opening toward the second opening, and wherein the finger portions include angled, outer side edges for laterally guiding the finger portions into the first opening.

14. The invention of claim 13 wherein the generally planar portion extends over a surface of the first body panel facing away from the second body panel as the finger portions proceed through the first opening, and the generally planar portion including the retaining member extending outwardly therefrom toward the finger portions.

15. The invention of claim 14 wherein the retaining member includes a tapered leading edge for raising the generally planar portion over the first body panel as the finger portions pass through the first opening.

16. The invention of claim 15 wherein the retaining member is dimensioned for receipt through the second opening of the first body panel.

17. The invention of claim 13 wherein the attachment portion is formed of a rigid plastic and the flexible seal region is one of a TPE or TPV.

* * * * *